United States Patent
Yoshida et al.

(10) Patent No.: US 7,150,489 B2
(45) Date of Patent: Dec. 19, 2006

(54) REINFORCING STRUCTURE FOR AUTOMOTIVE VEHICLES

(75) Inventors: Takahiro Yoshida, Niwa-gun (JP); Takashi Yamamoto, Okazaki (JP); Kenji Miyata, Nagoya (JP); Yuichiroh Shigematsu, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/797,527

(22) Filed: Mar. 9, 2004

(65) Prior Publication Data
US 2004/0178652 A1 Sep. 16, 2004

(30) Foreign Application Priority Data

| Mar. 10, 2003 | (JP) | ............................. 2003-063438 |
| Jul. 3, 2003 | (JP) | ............................. 2003-270755 |
| Aug. 1, 2003 | (JP) | ............................. 2003-285356 |

(51) Int. Cl.
*B62D 25/14* (2006.01)

(52) U.S. Cl. ................ 296/72; 296/193.02; 296/203.02

(58) Field of Classification Search ................ 296/70, 296/72, 203.02, 187.09, 193.02; 180/90; 280/779
See application file for complete search history.

(56) References Cited

U.S. PATENT DOCUMENTS

| 4,365,826 | A | * | 12/1982 | Iriyama .................... 280/779 |
| 4,671,536 | A | * | 6/1987 | Yoshimura ................. 280/779 |
| 4,682,788 | A | * | 7/1987 | Yoshimura ................. 280/779 |
| 6,250,678 | B1 | * | 6/2001 | Yoshinaka et al. .......... 280/752 |
| 6,378,934 | B1 | * | 4/2002 | Palazzolo et al. .......... 296/208 |
| 6,391,470 | B1 | * | 5/2002 | Schmieder et al. ......... 428/598 |
| 6,394,527 | B1 | * | 5/2002 | Ohno et al. ................. 296/72 |
| 6,450,533 | B1 | * | 9/2002 | Kimura et al. ............. 280/779 |
| 6,523,878 | B1 | * | 2/2003 | Scheidel ..................... 296/70 |
| 6,561,563 | B1 | * | 5/2003 | Okana et al. ................ 296/70 |
| 6,581,967 | B1 | * | 6/2003 | Logan et al. .............. 280/779 |
| 6,685,259 | B1 | * | 2/2004 | Shimase et al. ....... 296/203.02 |
| 2002/0117842 | A1 | * | 8/2002 | Takano et al. ............. 280/779 |

FOREIGN PATENT DOCUMENTS

| DE | 196 01 800 |   | 8/1996 |   |
| DE | 198 55 621 |   | 6/2000 |   |
| DE | 101 52 242 |   | 9/2003 |   |
| EP | 1035004    |   | 9/2000 |   |
| GB | 211061606  | * | 6/1983 | .................. 296/70 |
| JP | 8-183478   |   | 7/1996 |   |

* cited by examiner

*Primary Examiner*—D. Glenn Dayoan
*Assistant Examiner*—Greg Blankenship
(74) *Attorney, Agent, or Firm*—Harness, Dickey & Pierce, PLC

(57) ABSTRACT

A reinforcing structure for automotive vehicles is disclosed, in which cross car beams (1) constituting a reinforcing structure for the instrument panel or the like include an upper cross car beam (1A) of a hollow bar such as a small-diameter pipe straight or having a plurality of curves and suspended between left and right front pillars, and at least a lower cross car beam (1B) of a hollow bar such as an L-shaped small-diameter pipe. The part of the lower cross car beam nearer to the driver's seat is in contact and welded with the upper cross car beam, and the part of the lower cross car beam not in contact with the upper cross car beam functions as a brace (5). A steering shaft (3) is mounted on the cross car beams in the direction crossing the cross car beams. A lower cross car beam (1C) of a similar shape to the lower car beam nearer to the driver's seat can also be arranged nearer to the front passenger seat.

13 Claims, 14 Drawing Sheets

Fig.2
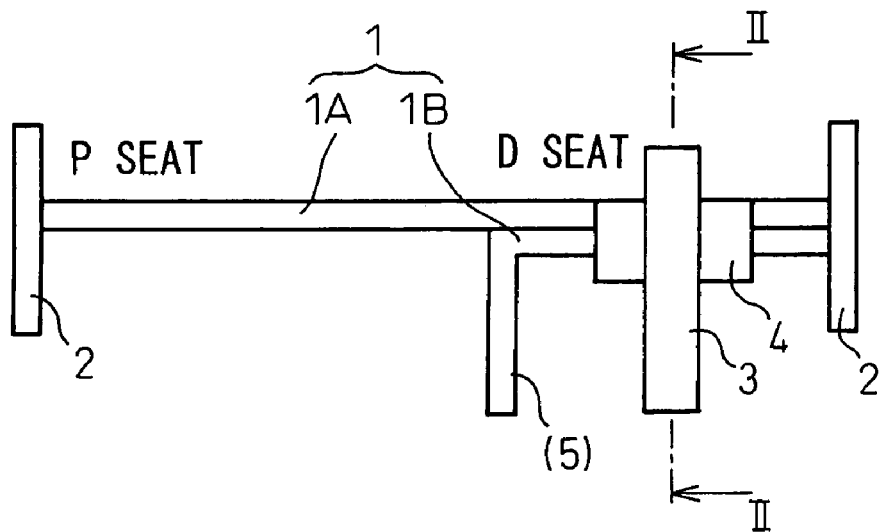
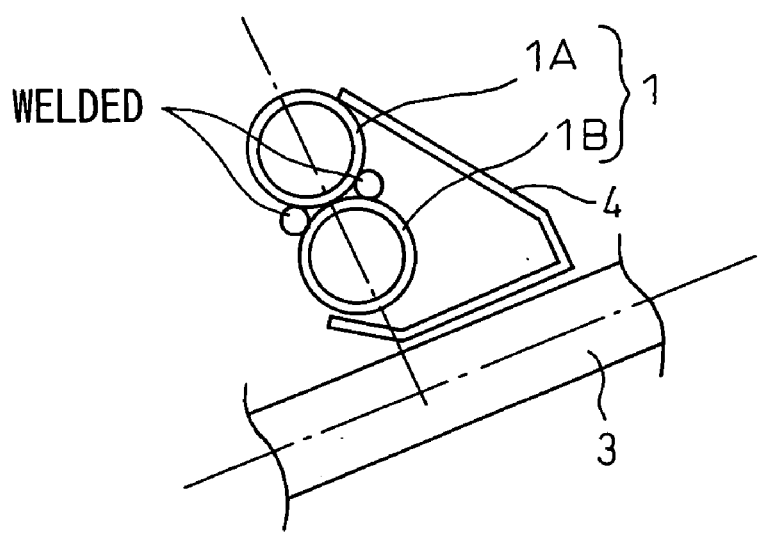
SECTIONAL VIEW ALONG II-II

Fig.5
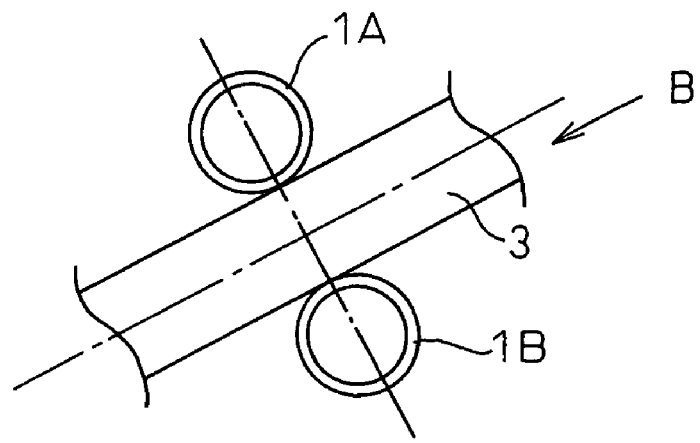
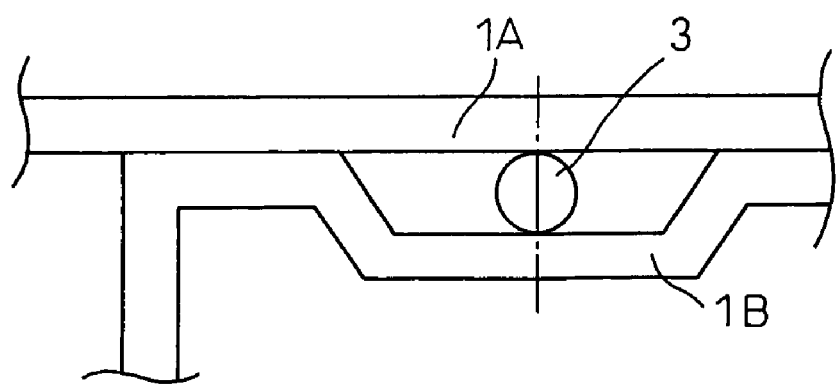
VIEW ALONG ARROW B

SECTIONAL VIEW ALONG $VII_1$-$VII_1$

SECTIONAL VIEW ALONG $VII_2$-$VII_2$

Fig.10
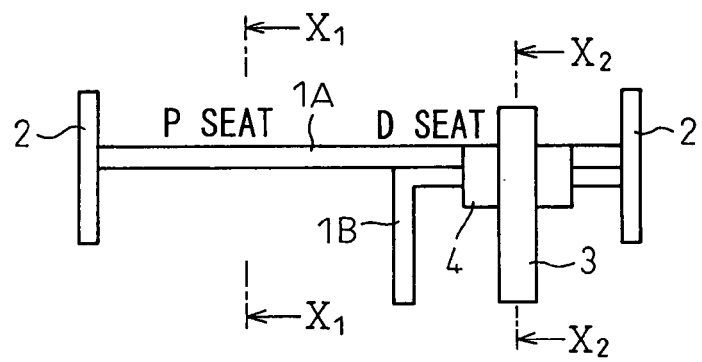
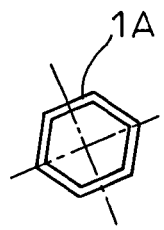
SECTIONAL VIEW
ALONG $X_1$-$X_1$
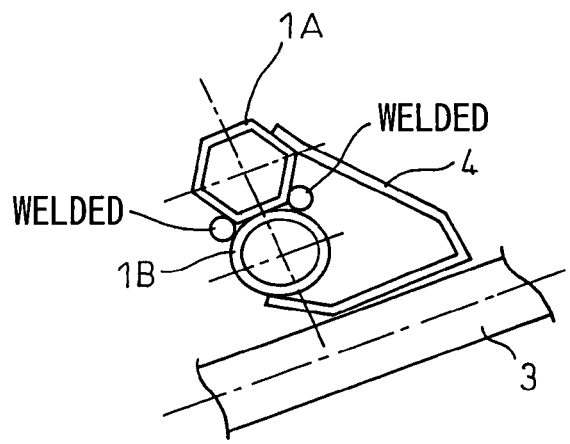
SECTIONAL VIEW
ALONG $X_2$-$X_2$ Fig.11
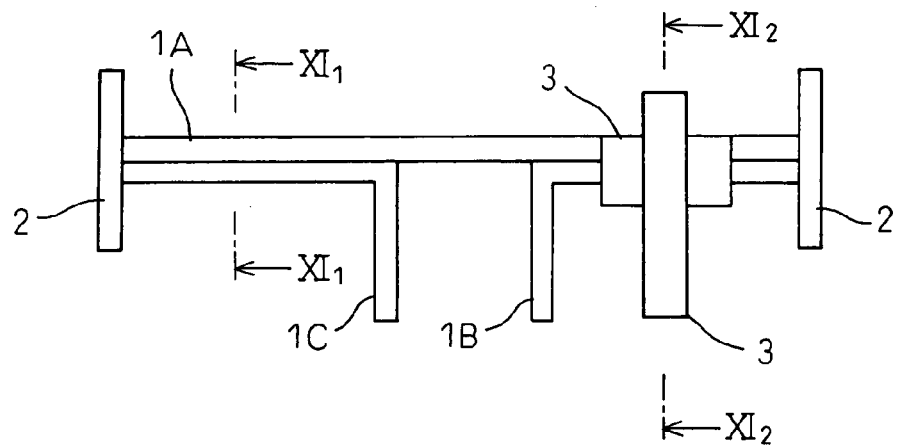
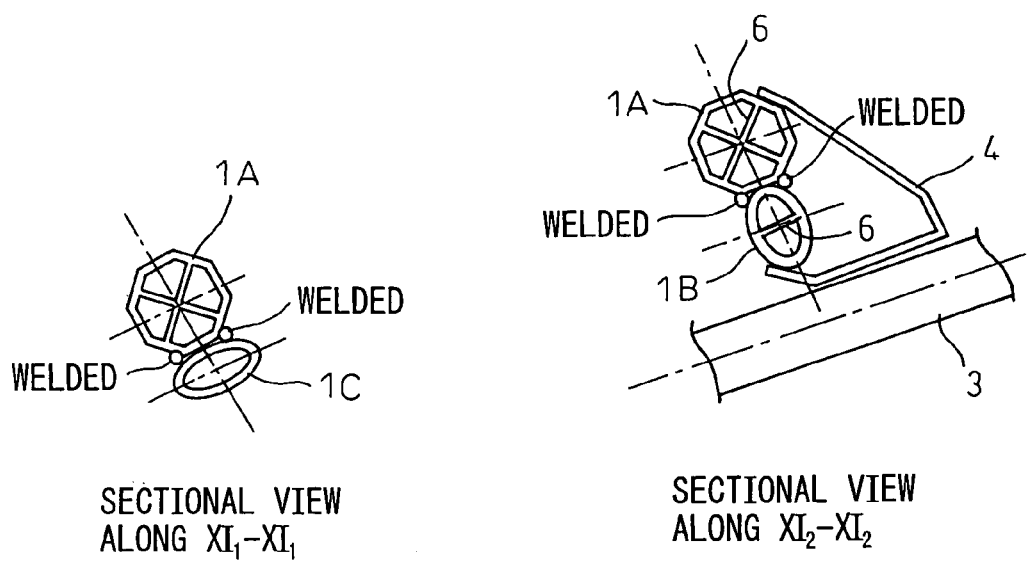
SECTIONAL VIEW
ALONG XI$_1$-XI$_1$
SECTIONAL VIEW
ALONG XI$_2$-XI$_2$

Fig.14

- WEIGHT AND AREA COMPARISON [mm]

|  | CONVENTIONAL CCB | 2-PIPE CCB | 3-PIPE CCB |
|---|---|---|---|
| CCB | Fe PIPE OF Φ54, t1.6 | Fe PIPE OF Φ38.1, t1.2 | Fe PIPE OF Φ38.1, t1.0 |
| BRACE | t 1.2 | - | - |

<WEIGHT EFFICIENCY> [kg]

| WEIGHT | CONVENTIONAL CCB | 2-PIPE CCB | 3-PIPE CCB |
|---|---|---|---|
| CCB | 2.80 | 1.48 | 1.25 |
| BRACE | 0.47 | 0.94 | 1.50 |
| SUM | 3.27 | 2.42 | 2.75 |

*WEIGHT CALCULATED FROM 3D MODEL.
BRACE WEIGHT OF 2- AND 3-PIPE CCBs
REPRESENTED BY L-SHAPED LOWER CCB WEIGHT

<SECTIONAL AREA> [mm²]

| SECTIONAL AREA | CONVENTIONAL CCB | 2-PIPE CCB | 3-PIPE CCB |
|---|---|---|---|
| CENTRAL PORTION | 9,161 | 4,560 | ← |
| D SEAT PORTION | 9,161 | 9,120 | ← |
| P SEAT PORTION | 9,161 | 4,560 | 9,120 |

- COMPARISON OF DEFORMATION STRENGTH ANALYSIS
  (REACTION AGAINST CCB 20mm INDICATED BY INDEX)

|  | CONVENTIONAL CCB | 2-PIPE CCB | 3-PIPE CCB |
|---|---|---|---|
| D SEAT PORTION | 100 | 100 | 105 |
| P SEAT PORTION | 100 | 55 | 105 |

Fig.15
PRIOR ART
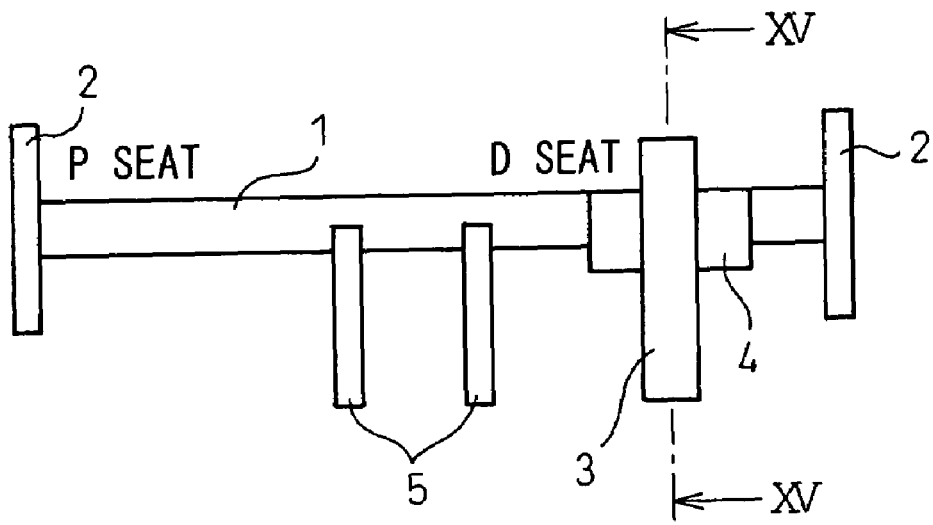
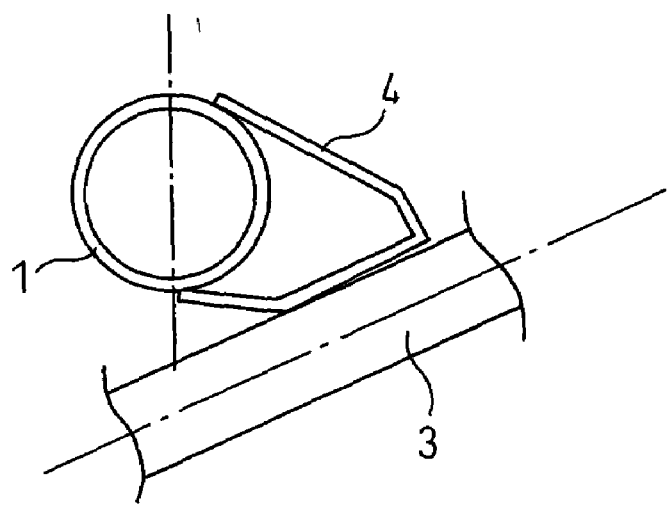
SECTION ALONG XV-XV

REINFORCING STRUCTURE FOR AUTOMOTIVE VEHICLES

BACKGROUND OF THE INVENTION

1. Field of the Invention

The present invention relates to a reinforcing structure for automotive vehicles applied to structural members such as a cross car beam in the instrument panel of the vehicle.

2. Description of the Related Art

In the prior art, as shown in FIG. 1, a cross car beam (CCB) 1 having side brackets 2 at the ends thereof is suspended between left and right front pillars as a structural member, at the back of the instrument panel, in the vehicle. On this cross car beam 1, a steering shaft 3 having a steering wheel 31 is fixed by a steering shaft support 4.

This conventional cross car beam 1, as shown in FIG. 15, is constituted of a large-diameter round pipe and supported by braces 5 erected on the vehicle floor. Taking the convenience for assembling on the vehicle into consideration, the cross car beam 1 has brackets (not shown) connected with ends of the braces 5 by bolts or the like. In this connecting method, however, a sufficient rigidity against twisting cannot be secured and, therefore, steering shaft vibration cannot be prevented.

In order to obviate the problem described above, an improved conventional method of connecting the cross car beam 1 and the braces 5 has been proposed in Japanese Unexamined Patent Publication No. 8-183478.

In this improved connecting method, vertical through holes are formed in the pipe of the cross car beam 1, and with the forward end of each brace 5 inserted in the corresponding one of the through holes, the braces and the pipe are fixedly welded to each other.

With the conventional cross car beam structure described above, however, a thick round pipe having a large section diameter is required to secure the strength and, therefore, the problem is posed of a low space utilization rate and a larger weight. An alternative structure, which has been proposed to secure the strength by increasing the diameter of only the part nearer to the driver's seat, requires the additional steps of increasing the pipe diameter or welding a small-diameter pipe and a large-diameter pipe to each other at a higher cost. Another problem is that the diameter of the round pipe portion nearer to the driver's seat is increased and this lowers the freedom for effective space utilization.

SUMMARY OF THE INVENTION

The present invention has been developed in view of the problem described above, and the object thereof is to provide a reinforcing structure, for automotive vehicles, which is lighter in weight and occupies a smaller space.

According to one aspect of the invention, there is provided a reinforcing structure for automotive vehicles, wherein cross car beams constituting a reinforcing member for the instrument panel or the like includes an upper cross car beam making up a hollow bar having a closed section suspended between the left and right front pillars and a lower cross beam making up a hollow bar having a closed section bent in the shape of L, and the part of the lower cross beam nearer to the driver's seat side (D seat) is in contact with the upper cross car beam and the part of the lower cross car beam not in contact with the upper cross car beam has the function of a brace. The cross car beams configured as two hollow bars reduce the weight of the reinforcing members as a whole on the one hand and the fact that the part of the structure nearer to the front passenger seat (P seat) is a single hollow bar also improves the space utilization rate in the instrument panel nearer to the front passenger seat, on the other hand. Further, as the brace is not required, the weight of the structure is correspondingly reduced.

The reinforcing structure for automotive vehicles according to this aspect of the invention further comprises a cross car beam of a hollow bar bent in the shape of L and nearer to the front passenger seat similar to the cross car beam nearer to the driver's seat, whereby the strength against the deformation of the cross car beam nearer to the front passenger seat as well as the driver's seat is secured.

With the reinforcing structure for automotive vehicles according to this aspect of the invention, the part of the upper cross car beam and the part of the lower cross car beam in contact with each other are welded to each other wholly or partly on the two sides of the contact line thereby to firmly integrate the upper cross car beam and the lower cross car beam with each other.

According to another aspect of the invention, there is provided a reinforcing structure for automotive vehicles, wherein the cross car beams constituting reinforcing members for the instrument panel, etc. include an upper cross car beam making up a hollow bar having a closed section suspended between the left and right front pillars and a lower cross car beam of a hollow bar having a closed section bent in the shape of L. The part of the lower cross car beam nearer to the driver's seat is arranged in spaced and substantially parallel relation with the upper cross car beam, while the remaining part of the lower cross car beam functions as a brace. The upper cross car beam and the lower cross car beam are connected to each other by at least a stay. In this way, this cross car beam structure having two hollow bars reduces the weight of the reinforcing members as a whole. Also, the cross car beam nearer to the front passenger seat is formed of a single hollow bar, thereby improving the utilization rate of the internal space of the part of the instrument panel nearer to the front passenger seat.

With the reinforcing structure for automotive vehicles according to this aspect of the invention, a lower cross car beam similar to the lower cross car beam nearer to the driver's seat is arranged also nearer to the front passenger seat and, therefore, a sufficient strength against deformation of the cross car beams is secured not only nearer to the driver's seat but also nearer to the front passenger seat.

According to still another aspect of the invention, there is provided a reinforcing structure for automotive vehicles, wherein cross car beams constituting reinforcing members for the instrument panel, etc. include an upper cross car beam constituting a hollow bar having a closed section suspended between left and right front pillars and two lower cross car beams constituting two hollow bars each having a closed section bent in the shape of L, wherein a part of one of the lower cross car beams nearer to the driver's seat or the front passenger seat is arranged in contact with the upper cross beam and welded along the contact line, while a part of the other lower cross car beam nearer to the front passenger seat or the driver's seat, as the case may be, is arranged in spaced and substantially parallel relation with the upper cross car beam and connected to the upper cross car beam with at least a stay. In this way, both the weight and the space required of the reinforcing members are reduced.

With the reinforcing structure for automotive vehicles according to this aspect of the invention, a brace is arranged at the central portion nearer to the front passenger seat to support the upper cross car beam, whereby the strength of the parts of the cross car beam structure nearer to both the driver's seat and the front passenger seat is increased while at the same time decreasing the weight as compared with the case in which an additional lower cross car beam is arranged nearer to the front passenger seat.

With the reinforcing structure for automotive vehicles according to this aspect of the invention, the lower cross car beams nearer to the driver's seat and to the front passenger seat are symmetric with each other, whereby the lower cross car beams can share the parts for a lower production cost.

With the reinforcing structure for automotive vehicles according to this aspect of the invention, the upper cross car beam has a plurality of curved portions, thereby increasing the packaging freedom of the cross beam structure.

With the reinforcing structure for automotive vehicles according to this aspect of the invention, the straight portion of the L-shaped lower cross car beam is slightly curved, whereby the packaging freedom of the cross car beam structure is increased.

With the reinforcing structure for automotive vehicles according to this aspect of the invention, the shape of the closed sections of the hollow bars making up the component members of the upper cross car beam and the lower cross car beam each is a circle, an ellipse, a square, a rectangle or any other polygon. According to this embodiment, not only a pipe having a circular section but also a hollow bar having a section of another shape can be employed.

With the reinforcing structure for automotive vehicles according to this aspect of the invention, a reinforcing bridge is arranged in each hollow bar, whereby each cross car beam is further increased in strength.

With the reinforcing structure for automotive vehicles according to this aspect of the invention, the shape of the closed section, the area of the closed section and the thickness of the hollow bar of the upper cross car beam may be the same as or different from those of the hollow bar of the lower cross car beam, so that the shape of the closed section, the area of the closed section and the thickness can be changed between the cross car beams to obtain the proper strength in accordance with the strength requirements of individual vehicles. In this case, these factors may be changed not only between the upper cross car beam and the lower cross car beam, but also between the lower cross car beams nearer the driver's seat and the front passenger seat.

With the reinforcing structure for automotive vehicles according to this aspect of the invention, the upper cross car beam and the lower cross car beam can be arranged arbitrarily either in either vertical or horizontal alignment, whereby an arrangement conforming to the vehicle space can be employed. In the case where the space has a margin in vertical direction, for example, the vertically aligned cross car beams can be employed.

With the reinforcing structure for automotive vehicles according to this aspect of the invention, the upper cross car beam and the lower cross car beam are arranged in such a manner as to sandwich a steering shaft mounted in the direction crossing the cross car beams, whereby a space can be secured above the steering shaft. In this case, the upper cross car beam or the lower cross car beam is required to be partially curved to allow the steering shaft to pass through the curved part.

The present invention may be more fully understood from the description of preferred embodiments of the invention, as set forth below, together with the accompanying drawings.

BRIEF DESCRIPTION OF THE DRAWINGS

FIG. 2 is a front view and a sectional view taken along line II—II of the cross car beam structure according to a first embodiment of the invention.

FIG. 5 is a sectional view of the cross car beam structure according to another modification of the first embodiment taken along a line similar to line II—II of the cross car beam structure of the first embodiment of the invention.

FIG. 10 is a front view and sectional views of the cross car beam structure according to a fourth embodiment of the invention taken along lines $X_1—x_1$ and $X_2—X_2$.

FIG. 11 is a front view and sectional views of the cross car beam structure according to a fifth embodiment of the invention taken along lines $XI_1—XI_1$ and $XI_2—XI_2$.

FIG. 14 is a table showing the result of comparison of the first and second embodiments of the invention with the prior art.

FIG. 15 is a front view and a sectional view taken along line XV—XV of the conventional cross car beam structure.

DESCRIPTION OF THE PREFERRED EMBODIMENTS

Figure 1:
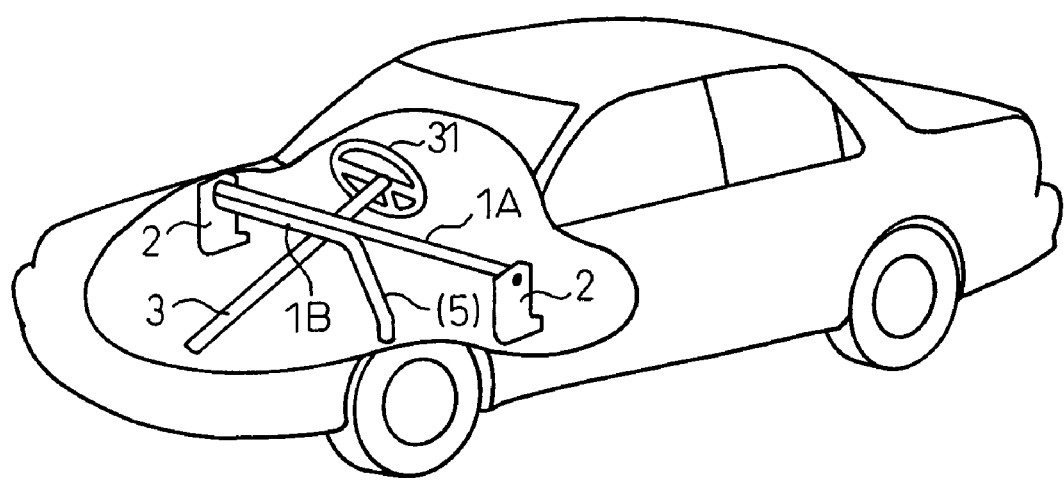
FIG. 1 is a diagram for explaining a cross car beam structure making up a reinforcing structure for automotive vehicles.

A reinforcing structure for automotive vehicles according to an embodiment of the invention is explained below with reference to the drawings. The description that follows refers to a cross car beam (CCB) as an example of an automotive reinforcing member, to which the invention is not limited. FIG. 1 is a diagram for explaining the position of the cross car beam in the whole structure of an automotive vehicle. Specifically, a cross car beam 1 is arranged on the back of an instrument panel (a panel on which instruments and the like parts are mounted) not shown, suspended between left and right front pillars, and supported on braces 5 erected on the vehicle floor. Side brackets 2 are fixed at the ends of the cross car beam 1, and a steering shaft 3 is mounted to the cross car beam 1 with a steering shaft support 4.

Figure 2A:
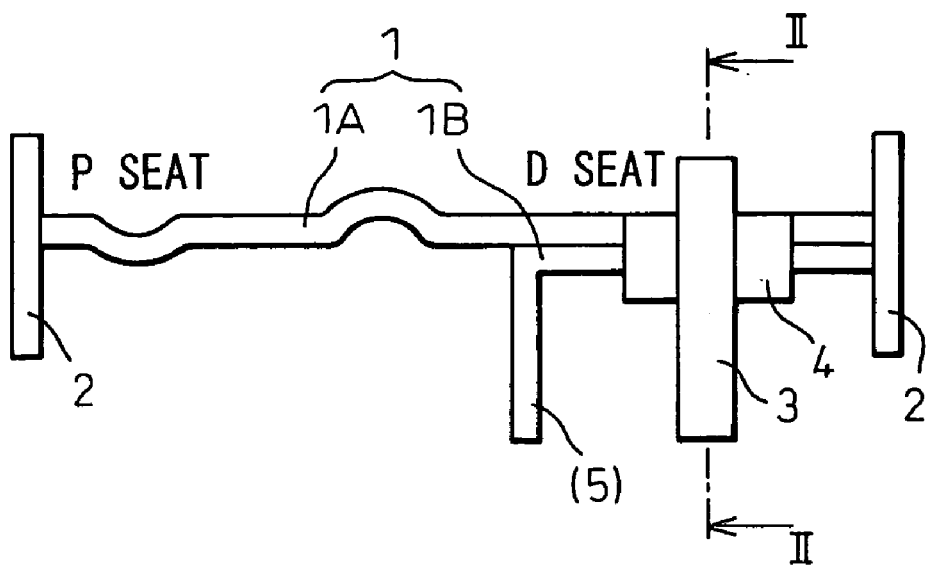
FIG. 2A is a front view similar to FIG. 2 but illustrating an upper cross beam having a plurality of curves.
Figure 2B:
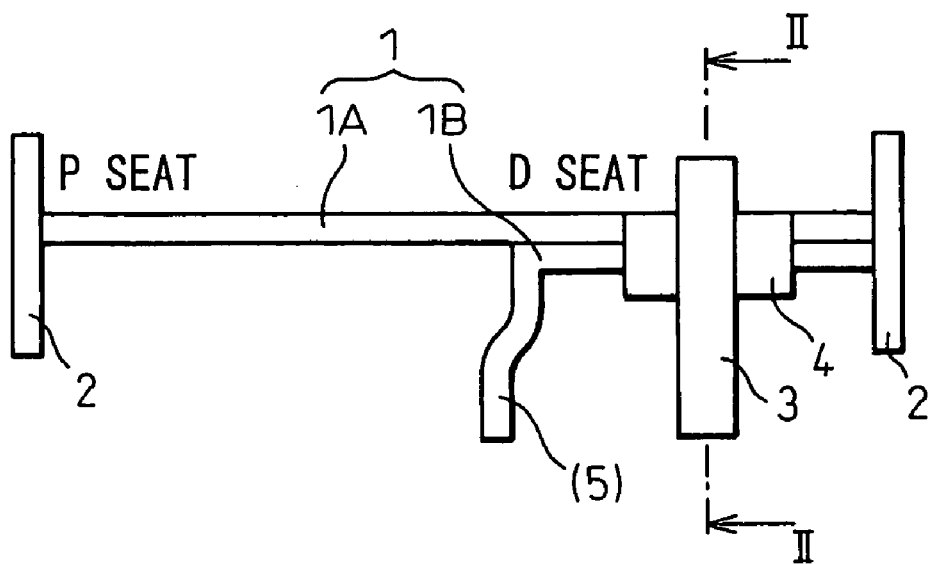
FIG. 2B is a front view similar to FIG. 2 but illustrating a curved cover cross beam.
Figure 3:
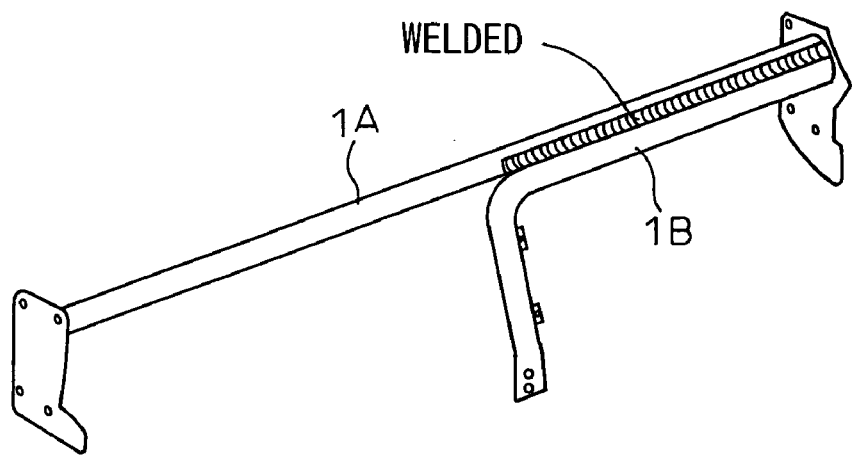
FIG. 3 is a perspective view of the cross car beam structure according to the first embodiment of the invention.

FIG. 2 is a diagram showing a general configuration of a cross car beam structure according to a first embodiment of the invention, and a sectional view taken along line II—II. As shown in FIG. 2, the cross car beam 1 according to this invention includes two small-diameter round pipes or the like hollow bars having a closed section, i.e. an upper cross car beam 1A and a lower cross car beam 1B. The upper cross car beam 1A is a linear hollow bar (pipe) with the ends thereof fixed on the side brackets 2. The lower cross car beam 1B is an L-shaped hollow bar (pipe) bent at about the central portion thereof and has an end thereof fixed on the side bracket 2 on the side nearer to the driver's seat (right side in the drawing). The part of the upper cross car beam 1A and the part of the lower cross car beam 1B nearer to the driver's seat, as shown in FIG. 3, are arranged in contact with each other and welded to each other in axial direction on both sides along the contact line therebetween. In this way, the part of the upper cross car beam 1A and the part of the lower cross car beam 1B nearer to the driver's seat are integrally coupled with each other by welding. The upper cross car beam 1A, which is shown as a linear hollow bar (pipe) in FIGS. 2 and 3, may alternatively be configured of a hollow bar (pipe) having a plurality of curves. Similarly, the L-shaped lower cross car beam 1B may have a slightly curved part instead of the straight part thereof with equal effect. The "closed section" is defined as a cross section closed on the inner peripheral edge thereof.

A steering shaft 3 is mounted, through a steering shaft support 4, in the direction crossing the upper cross car beam 1A and the lower cross car beam 1B of which the parts nearer to the driver's seat are integrally coupled with each other. In this case, as clear from the sectional view taken along line II—II, the upper cross car beam 1A and the lower cross car beam 1B are arranged in superposed relation with each other in the direction crossing the axis of the steering shaft 3.

That portion of the lower cross car beam 1B which is bent substantially at right angles to and not in contact with the upper cross car beam 1A functions as a brace 5 with the end thereof fixed on the vehicle floor.

Figure 4:
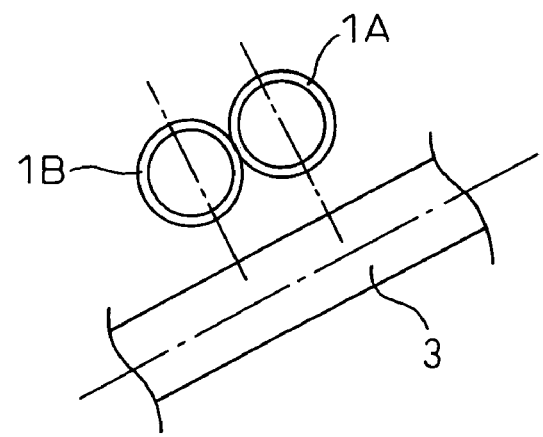
FIG. 4 is a sectional view of the cross car beam structure according to a modification of the first embodiment taken along a line similar to line II—II of the cross car beam structure of the first embodiment of the invention.

FIG. 4 shows a cross car beam structure according to a modification of the first embodiment of the invention. In the first embodiment, the upper cross car beam 1A and the lower cross car beam 1B are arranged in a superposed relation with each other in the direction crossing the axis of the steering shaft 3. According to this modification, on the other hand, the upper cross car beam 1A and the lower cross car beam 1B are arranged in juxtaposition along the axial direction of the steering shaft 3. The configuration of the remaining parts is similar to that of the first embodiment. In FIG. 4, the steering shaft support 4 is not shown.

The arrangement of the upper cross car beam 1A and the lower cross car beam 1B according to this modification advantageously saves the space in vertical direction (the direction crossing the axial direction of the steering shaft 3).

FIG. 5 shows a cross car beam structure according to another modification of the first embodiment of the invention. In this modification, the upper cross car beam 1A and the lower cross car beam 1B are arranged on both sides of the steering shaft 3. In this case, as shown in the view taken in the direction of arrow B of FIG. 5, the portion of the lower cross car beam 1B arranged along the upper cross car beam 1A is partially curved, and the steering shaft 3 is required to be arranged through the curved portion. The other parts of the configuration are similar to those of the first embodiment. The steering shaft support 4 is not shown also in FIG. 5.

The arrangement of the upper cross car beam 1A and the lower cross car beam 1B according to this modification advantageously saves the space above the steering shaft 3.

Figure 6:
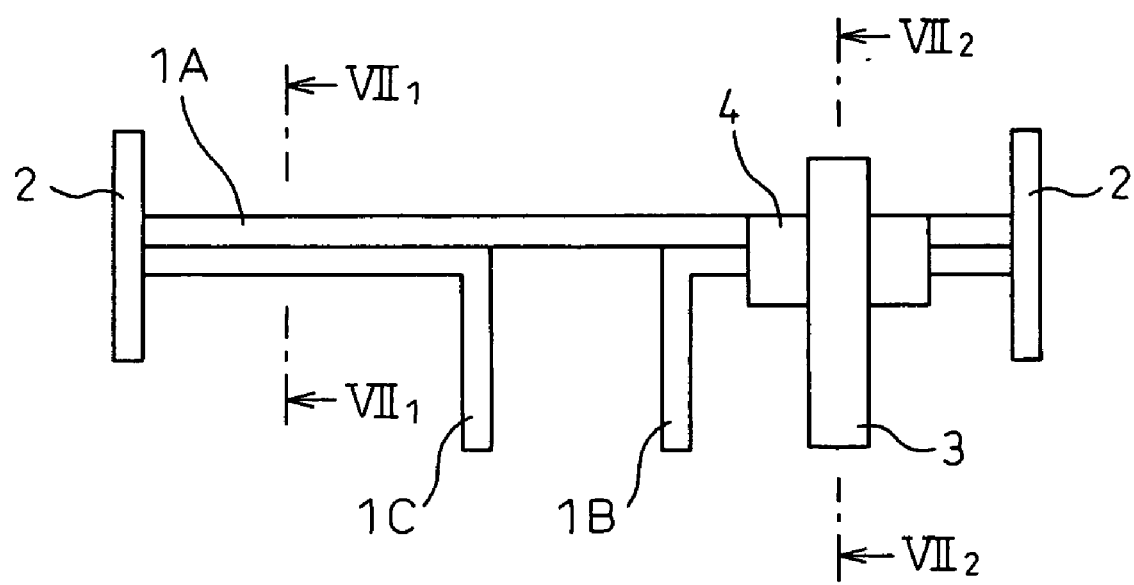
FIG. 6 is a front view of the cross car beam structure according to a second embodiment of the invention.
Figure 7A:
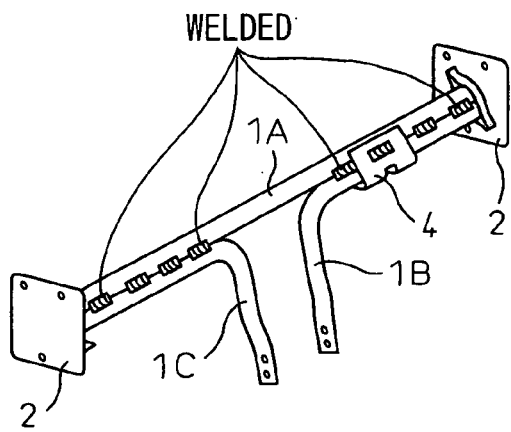
FIG. 7A is a perspective view of the cross car beam structure according to the second embodiment of the invention, FIG. 7B a sectional view taken along line $VII_1—VII_1$ in FIG. 6, and FIG. 7C a sectional view taken along line $VII_2—VII_2$ in FIG. 6.
Figure 7B:
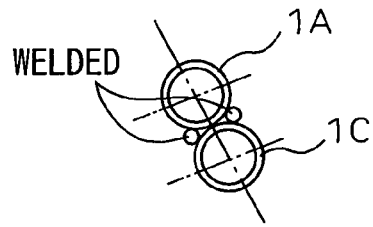
Figure 7C:
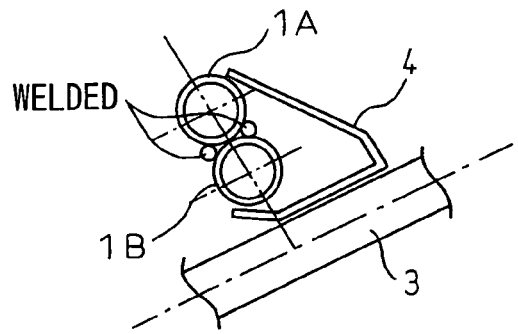

FIG. 6 shows a cross car beam structure according to a second embodiment of the invention. In the cross car beam structure according to the first embodiment described above, the lower cross car beam 1B is arranged only on the part of the structure nearer to the driver's seat (D seat). In the second embodiment, on the other hand, the lower cross car beam 1C is arranged also on the part of the structure nearer to the front passenger seat (P seat). The other parts of the configuration are similar to those of the first embodiment. The lower cross car beam 1C nearer to the front passenger seat, which is also an L-shaped hollow bar (pipe) having a closed section, is bent at about the central portion thereof and has an end thereof fixed on the side bracket 2 nearer to the front passenger seat (left side in FIG. 6). The part of the upper cross car beam 1A and the part of the lower cross car beam 1C nearer to the front passenger seat are arranged in contact with each other, and as shown in FIGS. 7B and 7C, welded integrally with each other in axial direction on both sides along the contact line. This welding process may be conducted either over the entire contact line, or partially as shown in FIG. 7A. That portion of the lower cross car beam 1C which is bent substantially at right angles and not in contact with the upper cross car beam 1A functions as a brace 5 with the end thereof fixed on the vehicle floor.

According to the second embodiment, as in the first embodiment shown in FIG. 7C, the upper cross car beam 1A and the part of the lower cross car beam 1B nearer to the driver's seat are arranged in a superposed relation with each other in the direction crossing the axis of the steering shaft 3. The upper cross car beam 1A and the part of the lower cross car beam 1C nearer to the front passenger seat are also arranged in superposed relation with each other in the same direction as shown in FIG. 7B. In FIGS. 7A to 7C, the upper cross car beam 1A has the same shape of the closed section, the same area of the closed section (pipe diameter) and the same thickness as the part of the lower cross car beams 1B, 1C nearer to the driver's seat and the front passenger seat, respectively. Not necessarily, however, they have the same shape of the closed section, the same area of the closed section and the same thickness but, depending on the strength requirements of individual vehicles, may have a different shape of the closed section, a different area of the closed section and a different thickness to secure the proper strength.

As described above, according to the second embodiment, the structure of the three hollow bars (pipes) including the upper cross car beam 1A and the lower cross car beams 1B, 1C improves the strength on the side nearer to the front passenger seat. Also, the structure of the three hollow bars (pipes) reduces the weight of the reinforcing members as a whole while at the same time improving the space utilization rate in the instrument panel of the central part of the cross car beams 1.

Figure 8A:
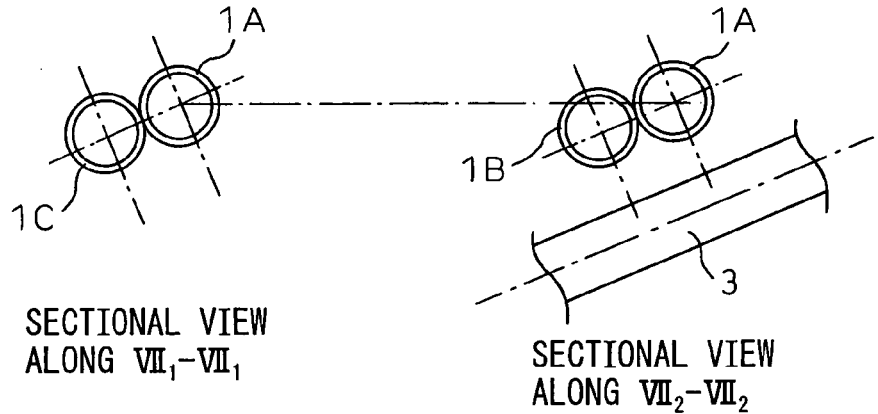
FIGS. 8A and 8B are sectional views of the cross car beam structure according to modifications of the second embodiment of the invention taken along lines similar to lines $VII_1—VII_1$ and $VII_2—VII_2$, respectively.
Figure 8B:
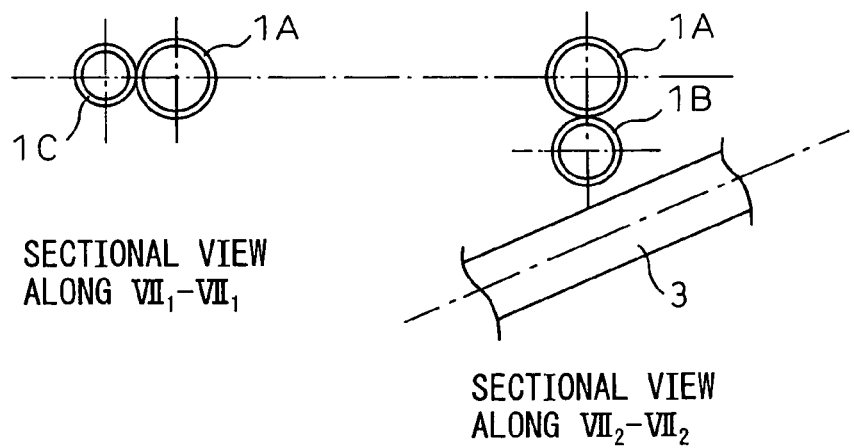

FIGS. 8A and 8B show cross car beam structures according to different modifications of the second embodiment. In these modifications, the hollow bars (pipes) including the upper cross car beam 1A and the lower cross car beams 1B, 1C are arranged at different relative positions. Specifically, in FIG. 8A, the upper cross car beam 1A and the lower cross car beam 1B nearer to the driver's seat are arranged in juxtaposition in the direction parallel to the axis of the steering shaft 3, and the upper cross car beam 1A and the lower cross car beam 1C nearer to the front passenger seat are also arranged in juxtaposition in a similar direction. In FIG. 8B, on the other hand, the upper cross car beam 1A and the lower cross car beams 1B nearer to the driver's seat are arranged in superposed relation with each other on the axis at a predetermined angle to the steering shaft 3, while the upper cross car beam 1A and the lower cross car beam 1C nearer to the front passenger seat are arranged in juxtaposition on an axis crossing another axis set at an angle to the steering shaft 3. In this way, the position of the lower cross car beams 1B, 1C relative to the upper cross car beam 1A can be differentiated between the side nearer to the driver's seat and the side nearer to the front passenger seat.

The arrangement of the upper cross car beam 1A and the lower cross car beams 1B, 1C as shown in FIG. 8A advantageously saves the space in vertical direction on both the sides nearer to the driver's seat and the front passenger seat. The arrangement of the upper cross car beam 1A and the lower cross car beams 1B, 1C as shown in FIG. 8B, on the other hand, saves the space in vertical direction on the side nearer to the front passenger seat, and the space in longitudinal direction on the side nearer to the driver's seat. In this way, the relative positions of the pipes constituting the upper cross car beam 1A and the lower cross car beams 1B, 1C can be changed in the desired direction including the vertical and horizontal directions. Also, as shown in FIG. 8B, the space can further be saved by reducing the diameter of the lower cross car beams 1B, 1C as compared with that of the upper cross car beam 1A. According to this second embodiment, as in the first embodiment, the upper cross car beam 1A is not limited to a straight hollow bar (pipe) but may be a curved hollow bar (pipe). Also, the straight portion of the L-shaped lower cross car beams 1B, 1C may be curved slightly.

Figure 9:
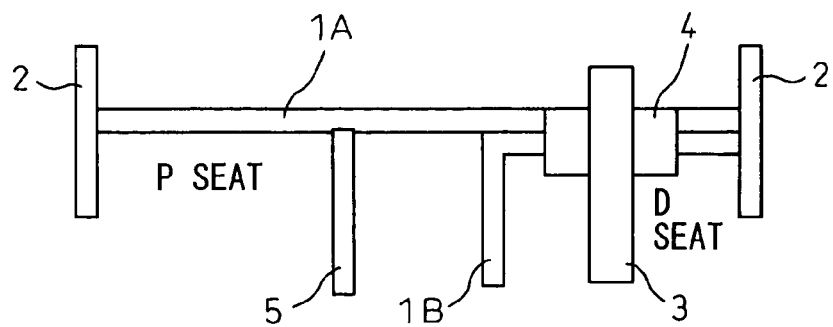
FIG. 9 is a front view of the cross car beam structure according to a third embodiment of the invention.

FIG. 9 shows a cross car beam structure according to a third embodiment of the invention. Unlike in the first embodiment, in which only the part of the lower cross car beam 1B nearer to the driver's seat effectively functions as a brace, the third embodiment additionally includes a brace 5 at about the central portion nearer to the front passenger seat. The other parts of the configuration are similar to those of the first embodiment. The brace 5 is coupled to and supports the upper cross car beam 1A. The cross car beam structure according to the third embodiment, like that of the first embodiment, is configured of two hollow bars (pipes) including the upper cross car beam 1A and the lower cross car beam 1B on the side nearer to the driver's seat. By adding the brace 5 on the side nearer to the front passenger seat, however, the strength of the cross car beam structure nearer to the front passenger seat is improved as compared with the first embodiment. Also, the structure according to the third embodiment is simpler and lighter in weight than the structure having three hollow bars (pipes) according to the second embodiment.

FIG. 10 shows a cross car beam structure and sectional views taken along lines $X_1$—$X_1$ and $X_2$—$X_2$ according to a fourth embodiment of the invention. This embodiment, based on the cross car beam 1 having the structure of two hollow bars (pipes) of the first embodiment shown in FIG. 1, is configured of an upper cross car beam 1A constituted of a straight hollow bar and an L-shaped lower cross car beam 1B formed of a single hollow bar. According to this embodiment, however, the closed section of the hollow bar constituting the upper cross car beam 1A is hexagonal and has a comparatively small area. Also, the closed section of the hollow bar constituting the lower cross car beam 1B is circular with a small diameter (small sectional area). The upper cross car beam 1A having a hexagonal section and a part of the L-shaped lower cross car beam 1B are in contact with each other and welded to each other on both sides along the contact line. The upper cross car beam 1A and the lower cross car beam 1B are not necessarily welded to each other over the entire contact line, but may be partially welded as long as a sufficient welding strength can be secured.

As described above, the closed section of the upper cross car beam 1A constituting a hollow bar is not necessarily circular unlike in the embodiment described above, but may be hexagonal according to this embodiment. Specifically, the closed section of the upper cross car beam 1A may be a circle including an ellipse or a polygon such as a triangle or a rectangle in shape or the periphery thereof may have a combination of a curved part and a flat part.

In similar fashion, the lower cross car beam 1B is not necessarily circular in section, but like the upper cross car beam 1A, may have any shape of the section as far as closed. The cross car beams 1 having three hollow bars (pipes) may be constituted of hollow bars with the closed section in any of various shapes.

FIG. 11 shows a cross car beam structure and sectional views taken along lines $XI_1$—$XI_1$ and $XI_2$—$X_2$ according to a fifth embodiment of the invention. This embodiment, on the basis of the cross car beams 1 having the structure of three hollow bars (pipes) of the second embodiment shown in FIG. 6, is configured of an upper cross car beam 1A constituted of a straight hollow bar and two lower cross car beams 1B, 1C formed of two L-shaped hollow bars. According to this embodiment, however, the closed section of the hollow bar constituting the upper cross car beam 1A is octagonal and has a comparatively small area. Also, the closed section of the hollow bars constituting the lower cross car beams 1B, 1C is an ellipse. In addition, the lower cross car beam 1B nearer to the driver's seat and the lower cross car beams 1C nearer to the front passenger seat have different ratios between the long diameter and the short diameter of the ellipse, the ratio being smaller with a more circular section for the lower cross car beam 1B nearer to the driver's seat.

Further, according to the fifth embodiment, a reinforcing bridge 6 having a cross-shaped section is inserted in the upper cross car beam 1A. Also, a tabular reinforcing bridge 6 is inserted in the lower cross car beam 1B nearer to the driver's seat. The reinforcing bridges 6 are for reinforcing the cross car beams, respectively, and are not necessarily required as long as the beams have a sufficient strength.

The upper cross car beam 1A having an octagonal section and a part of the L-shaped lower cross car beams 1B, 1C having an elliptic section are in contact with each other and welded to each other on both sides along the contact line. Nevertheless, these cross car beams are not necessarily welded to each other on both sides along the entire contact line but a part of the contact line as far as a sufficient welding strength can be secured.

As described above, the upper cross car beam 1A and the lower cross car beams 1B, 1C constituted of hollow bars can have a closed section in any of various shapes, and by inserting the reinforcing bridge in the beams, the beam strength can be increased.

According to the fourth and fifth embodiments, the upper cross car beam 1A and the lower cross car beams 1B, 1C are arranged in vertically superposed relation with each other along the direction crossing the axis of the steering shaft 3.

Nevertheless, the beams may alternatively be juxtaposed in the direction parallel to the axis of the steering shaft 3 with equal effect.

Figure 12A:
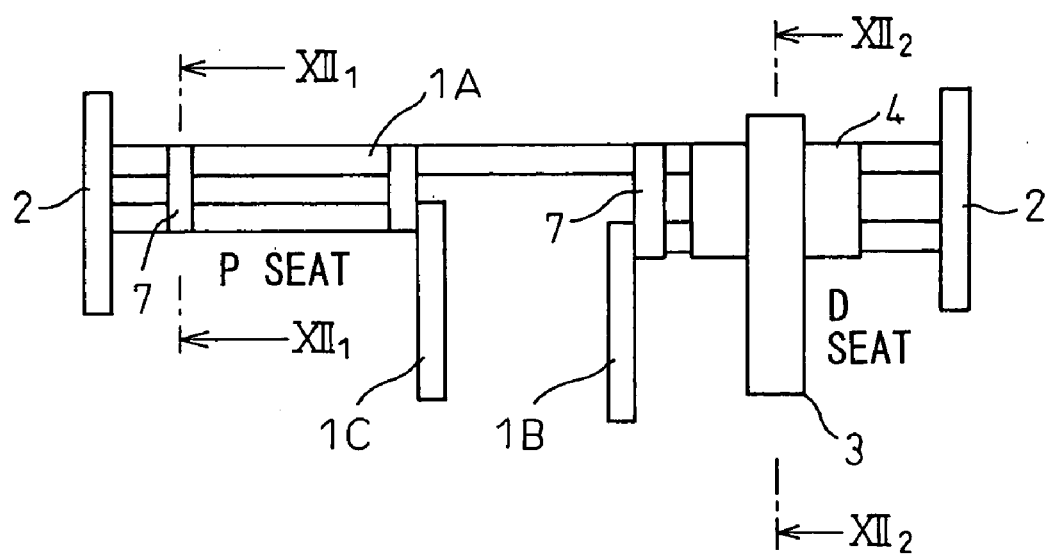
FIG. 12A is a front view of the cross car beam structure according to a sixth embodiment of the invention.
Figure 12B:
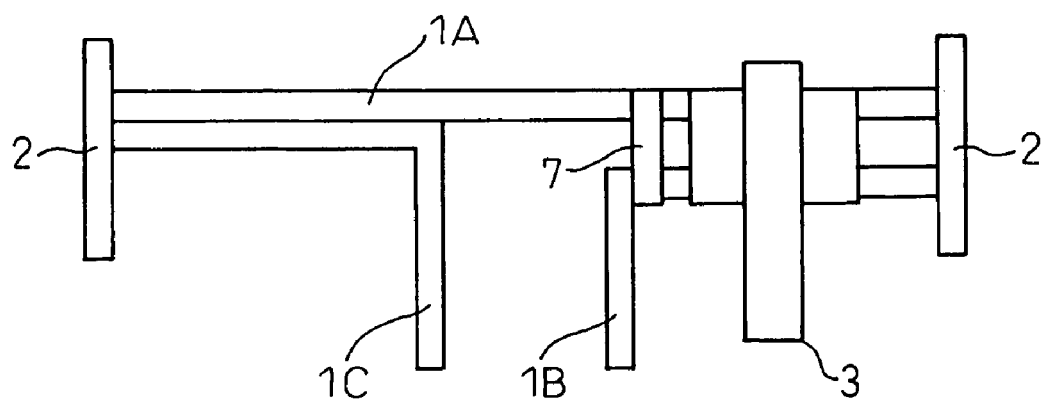
FIG. 12B shows a modification thereof.

FIG. 12A shows a cross car beam structure according to a sixth embodiment of the invention. According to this embodiment, the upper cross car beam 1A and the L-shaped lower cross car beams 1B, 1C are arranged in spaced and substantially parallel relation with each other and coupled to each other by stays 7. The stays 7 are welded to the upper cross car beam 1A and the L-shaped lower cross car beams 1B, 1C. Any desired number of stays 7 may be employed. The stays 7 may assume any appropriate form such as a pipe member or a metal plate. As shown in a modification in FIG. 12B, the lower cross car beam 1C and the upper cross car beam 1A can be directly coupled to each other by welding, while the lower cross car beam 1B and the upper cross car beam 1A can be connected to each other using the stays 7.

Figure 13A:
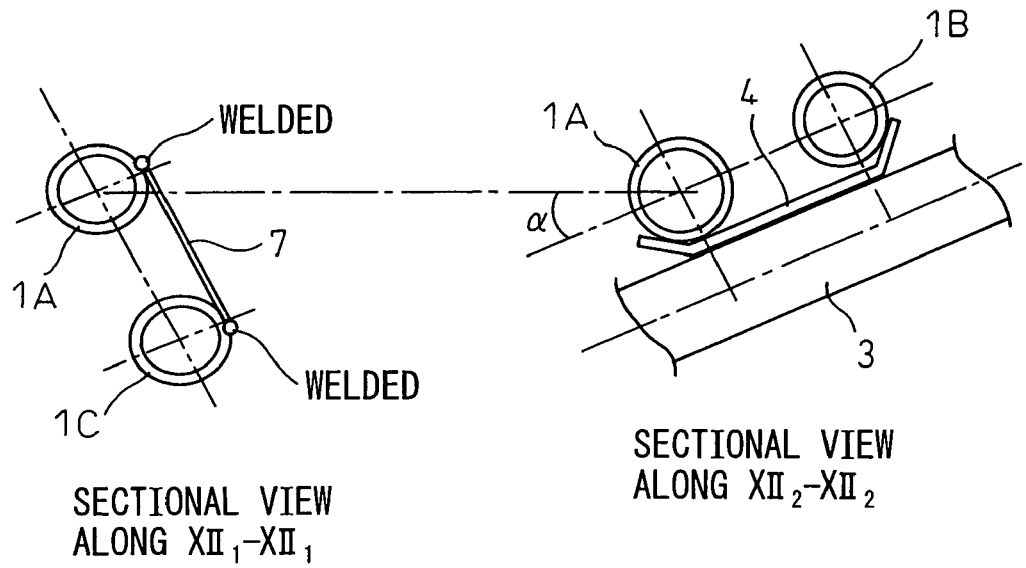
FIG. 13A is sectional views of the cross car beam structure according to a sixth embodiment of the invention taken along lines $XII_1—XII_1$ and $XII_2—XII_2$, and FIG. 13B sectional views of a modification of the sixth embodiment taken along similar lines.

FIG. 13A shows relative positions of the upper cross car beam 1A and the lower cross car beams 1B, 1C according to the sixth embodiment, and sectional views taken along lines $XII_1$—$XII_1$ and $XII_2$—$XII_2$ in FIG. 12A. The part of the upper cross car beam 1A and the part of the lower cross car beam 1C nearer to the front passenger seat are arranged in vertically spaced relation with each other in the direction crossing the axis of the steering shaft 3. The part of the upper cross car beam 1A and the part of the lower cross car beam 1C nearer to the driver's seat, on the other hand, are arranged in a spaced relation with each other and in parallel to the axis of the steering shaft 3. In these relative positions of the upper cross car beam 1A and the lower cross car beams 1B, 1C, the space can be secured in longitudinal direction on the side nearer to the front passenger seat and in vertical direction on the side nearer to the driver's seat, respectively.

Figure 13B:
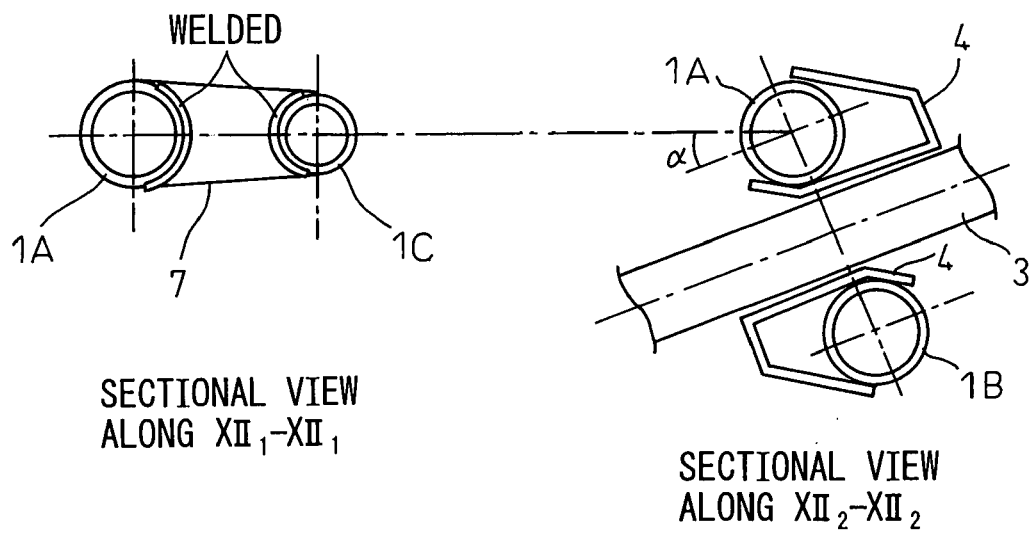

FIG. 13B shows relative positions of the upper cross car beam 1A and the lower cross car beams 1B, 1C of the cross car beam structure according to a modification of the sixth embodiment, and sectional views taken along lines $XII_1$—$XII_1$ and $XII_2$—$XII_2$ in FIG. 12A. In this case, the part of the upper cross car beam 1A and the part of the lower cross car beam 1C nearer to the front passenger seat are arranged in spaced relation with each other on the line at a predetermined angle α to the axis of the steering shaft 3. The upper cross car beam 1A and the lower cross car beam 1C are, of course, connected to each other by the stays 7. The part of the upper cross car beam 1A and the part of the lower cross car beam 1B nearer to the driver's seat, on the other hand, are arranged on both sides of the steering shaft 3 along the direction crossing the axis of the steering shaft 3. Further, according to this modification, the upper cross car beam 1A and the lower cross car beams 1B, 1C have circular closed sections of different diameters. Specifically, the upper cross car beam 1A is formed of a circular hollow bar slightly larger in diameter than the lower cross car beams 1B, 1C. The arrangement according to this modification can improve the space utilization rate in vertical direction on the side nearer to the front passenger seat and in longitudinal direction on the side nearer to the driver's seat.

As described above, according to the sixth embodiment, the closed sections of all the hollow bars of the upper cross car beam 1A and the lower cross car beams 1B, 1C of the cross car beam structure are circular. In spite of this, the closed section of each beam may assume a different shape such as a circle including an ellipse, a polygon including a triangle or may have the periphery formed of a combination of a curved part and a flat part. Also, the relative positions of the upper cross car beam 1A and the lower cross car beams 1B, 1C may be arbitrary and other than vertical or horizontal.

The specifications of the materials of the component parts of the cross car beam structure according to this invention are as follows: The upper cross car beam and the lower cross car beam are small-diameter hollow bars such as round pipes or the like of such a material as iron (Fe) or aluminum (Al). The brace and the steering support are pressed products and also made of iron or aluminum. The steering support is fixed by welding or the like to the cross car beams. The side brackets are also pressed products made of iron or aluminum.

The reinforcing bridges are also made of iron or aluminum. Similarly, the stays are formed of pipes or metal plates of iron or aluminum.

Tables in FIG. 14 show the result of a comparison made by weight, sectional area and deformation strength analysis between the conventional cross car beam structure of FIG. 15 and the cross car beam structures according to the first and second embodiments of the invention. The analysis software MARC2000 is used, and the analysis models are configured of (1) the upper cross car beam (upper CCB), (2) the lower cross car beam (lower CCB), (3) the steering support, (4) the brackets on both sides, and (5) the steering shaft.

In the conventional cross car beam (CCB) structure, a large-diameter iron pipe having a diameter φ of 54 mm and a thickness t of 1.6 mm and a brace having a thickness t of 1.2 mm are used. In a two-pipe cross car beam (CCB) structure according to this invention, in contrast, a small-diameter iron pipe having a diameter φ of 38.1 mm and a thickness t of 1.2 mm is used but brace, as a separate product, is not used. In a three-pipe cross car beam (CCB) structure, on the other hand, an iron pipe having a diameter φ of 38.1 mm and a thickness t of 1.0 mm is used.

As seen from the comparison table of the weight efficiency shown in FIG. 14, the two-pipe cross car beam structure according to the invention is about 26% lighter than the conventional cross car beam. The three-pipe cross car beam structure according to the invention, on the other hand, is about 15% smaller in weight than the conventional cross car beam structure.

It is also seen from the comparison table of the sectional area that the figures are not so different on the side of the driver's seat (D seat portion), while at the center portion, the two-pipe cross car beam structure according to the invention can save about 50% more space than the conventional cross car beam structure. In the case of the three-pipe cross car beam structure according to the invention, on the other hand, the weight reduction of about 15% is realized.

Further, as understood from the table of comparing the result of the deformation strength analysis, the three-pipe cross car beam structure according to the invention has a strength at least equivalent to the conventional cross car beam structure. The deformation strength analysis is conducted by applying a load from the horizontal direction on the sides nearer to the driver's seat (D seat portion) and the front passenger seat (P seat portion).

It will thus be understood from the foregoing description that, according to this invention, the use of two small-diameter pipes or the like hollow bars for the cross car beam structure reduces the weight of the reinforcing structural members as a whole without reducing the strength thereof on the one hand and improves the space utilization rate in the instrument panel on both the center portion and the part of the structure nearer to the front passenger seat, on the other hand. Also, by employing the three small-diameter pipes or the like hollow bars, the weight is reduced and the strength of the reinforcing members as a whole is increased while, at the same time, improving the strength of the part of the structure nearer to the front passenger seat.

While the invention has been described by reference to specific embodiments chosen for purposes of illustration, it should be apparent that numerous modifications could be made thereto by those skilled in the art without departing from the basic concept and scope of the invention.

The invention claimed is:

1. A reinforcing structure for an automotive vehicle comprising:
   a plurality of cross car beams arranged on a back of an instrument panel in the vehicle supported by a pair of braces erected on the vehicle floor, wherein
   said plurality of cross car beams include an upper cross car beam of a hollow bar having a closed section suspended between left and right front pillars and a first lower cross car beam of a hollow bar having a closed section bent in the shape of an L,
   a first part of said first lower cross car beam nearer to a driver's seat is in contact with said upper cross car beam, and a second part of said first lower cross car beam not in contact with said upper cross car beam defines one of said braces;
   a second lower cross car beam of a hollow bar having a closed section bent in the shape of an L is arranged nearer to a front passenger seat,
   a first part of said second lower cross car beam is in contact with said upper cross car beam,
   a second part of said second lower cross car beam not in contact with said upper cross car beam defines the other of said braces; and
   the upper cross car beam and the first lower cross car beam nearer to the driver's seat are arranged in superposed relation with each other on a first axis at a first predetermined angle to a steering shaft, while the upper cross car beam and the second lower cross car beam nearer to the front passenger seat are arranged in juxtaposition on a second axis at a second predetermined angle to the steering shaft, said second predetermined angle being different than said first predetermined angle.

2. A reinforcing structure for an automotive vehicle according to claim 1,
   wherein a part of said upper cross car beam and the first part of said first lower cross car beam in contact with each other are wholly or partly welded to each other in an axial direction on both sides along a contact line therebetween.

3. A reinforcing structure for an automotive vehicle according to claim 1,
   wherein the other of said braces for supporting said upper cross car beam is disposed on a part of the central portion of said upper cross car beam closer to the front passenger seat.

4. A reinforcing structure for an automotive vehicle according to claim 1,
   wherein the first part of said first lower cross car beam nearer to the driver's seat and the first part of said second lower cross car beam nearer the front passenger seat are symmetric with each other.

5. A reinforcing structure for an automotive vehicle according to claim 1,
   wherein said upper cross car beam has a plurality of curved parts.

6. A reinforcing structure for an automotive vehicle according to claim 1,
   wherein said L-shaped first lower cross car beam is slightly curved.

7. A reinforcing structure for an automotive vehicle according to claim 1,
   wherein the closed section of each hollow bar constituting said upper cross car beam and said first lower cross car beam is in a shape selected from one of a circle, an ellipse, a square, a rectangle or another polygon.

8. A reinforcing structure for an automotive vehicle according to claim 7,
   wherein a reinforcing bridge is arranged in each of said hollow bars.

9. A reinforcing structure for an automotive vehicle according to claim 1,
   wherein the closed sections of the hollow bar of said upper cross car beam and the hollow bar of said first lower cross car beam are selected from one of the same shape, different shapes, same area, different areas, same thickness and different thicknesses.

10. A reinforcing structure for an automotive vehicle according to claim 1,
    wherein said upper cross car beam and said first lower cross car beam are arranged in arbitrary relative positions including superposition and juxtaposition.

11. A reinforcing structure for an automotive vehicle according to claim 1,
    wherein a steering shaft is mounted on said cross car beams in a direction crossing said cross car beams, and
    wherein said steering shaft is arranged between said upper cross car beam and said first lower cross car beam.

12. A reinforcing structure for an automotive vehicle according to claim 1, wherein a first single piece bracket is located on a first side of the vehicle and a second single piece bracket is located on a second side of the vehicle, and the first part of the first lower cross car beam in contact with the upper cross car beam and the upper cross car beam are attached to either the first or the second single piece bracket.

13. A reinforcing structure for an automotive vehicle according to claim 1, wherein an end portion of the upper cross car beam on a front pillar side is in contact with an end portion of the first lower cross car beam on the front pillar side.

* * * * *